United States Patent
Yarbrough et al.

(10) Patent No.: US 9,377,005 B2
(45) Date of Patent: Jun. 28, 2016

(54) AIRFOIL MODIFIERS FOR WIND TURBINE ROTOR BLADES

(71) Applicant: General Electric Company, Schenectady, NY (US)

(72) Inventors: Aaron A. Yarbrough, Clemson, SC (US); Stefan Herr, Greenville, SC (US); Christian A. Carroll, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 555 days.

(21) Appl. No.: 13/832,848

(22) Filed: Mar. 15, 2013

(65) Prior Publication Data

US 2014/0271213 A1    Sep. 18, 2014

(51) Int. Cl.
F03D 1/06 (2006.01)
F03D 3/06 (2006.01)

(52) U.S. Cl.
CPC .............. *F03D 1/0641* (2013.01); *F03D 3/061* (2013.01); *F05B 2240/301* (2013.01); *Y02E 10/721* (2013.01); *Y02E 10/74* (2013.01)

(58) Field of Classification Search
CPC ....... F03D 1/237; F03D 3/061; F03D 1/0641; F05B 2240/301; F04D 29/324
USPC ............................ 416/223 R, 237, 228, 236 R
See application file for complete search history.

(56) References Cited

U.S. PATENT DOCUMENTS

| | | | | |
|---|---|---|---|---|
| 1,893,064 A * | 1/1933 | Zaparka | ................... | B64C 3/14 244/198 |
| 4,618,313 A * | 10/1986 | Mosiewicz | .............. | B64C 11/18 416/23 |
| 5,492,448 A * | 2/1996 | Perry | .................... | B64C 3/14 416/228 |
| 6,699,016 B1 * | 3/2004 | Dean | .................... | B63H 1/26 416/223 R |
| 8,419,373 B1 * | 4/2013 | Fukami | ................. | F03D 1/0633 415/4.3 |
| 8,834,127 B2 * | 9/2014 | Giguere | ................ | F03D 1/0633 416/228 |
| 2009/0016891 A1 * | 1/2009 | Parsania | ................ | F03D 1/0675 416/223 R |
| 2009/0274559 A1 | 11/2009 | Petsche et al. | | |
| 2010/0278657 A1 | 11/2010 | Kildegaard | | |

(Continued)

FOREIGN PATENT DOCUMENTS

| DE | 19614420 A1 | 10/1997 |
|---|---|---|
| EP | 1112928 A2 | 7/2001 |
| EP | 2604856 A1 | 6/2013 |

OTHER PUBLICATIONS

Kentfield et al., "The Flow Physics of Gurney Flaps, Devices for Improving Turbine Blade Performance", Wind Engineering, vol. No. 17, Issue No. 1, pp. 24-34, Jan. 1, 1993 XP000398952.

(Continued)

*Primary Examiner* — Kenneth Bomberg
*Assistant Examiner* — Jason T Newton
(74) *Attorney, Agent, or Firm* — Dority & Manning, P.A.

(57) ABSTRACT

In one aspect, a rotor blade for a wind turbine is disclosed. The rotor blade may include a body extending between a blade root and a blade tip. The body may define a pressure side and a suction side extending between a leading edge and a trailing edge. In addition, the body may define a chord line extending between the leading and trailing edges. The rotor blade may also include an airfoil modifier coupled to at least one of the pressure side or the suction side of the body. The airfoil modifier may define an end surface disposed adjacent to the trailing edge. At least a portion of the end surface may extend at a non-perpendicular angle relative to the chord.

10 Claims, 9 Drawing Sheets

(56) References Cited

U.S. PATENT DOCUMENTS

| | | | | |
|---|---|---|---|---|
| 2013/0129519 A1* | 5/2013 | Nielsen | ............ | F03D 1/0633 416/228 |
| 2014/0093380 A1* | 4/2014 | Drobietz | ............ | F03D 1/0641 416/228 |
| 2015/0050154 A1* | 2/2015 | Dixon | ............ | F03D 1/0633 416/223 A |
| 2015/0176563 A1* | 6/2015 | Grasso | ............ | F03D 1/0641 416/147 |
| 2015/0292522 A1* | 10/2015 | Singh | ............ | F04D 29/667 415/1 |

OTHER PUBLICATIONS

European Search Report issued in connection with corresponding EP Application No. 14158851.7 on Aug. 4, 2014.

* cited by examiner

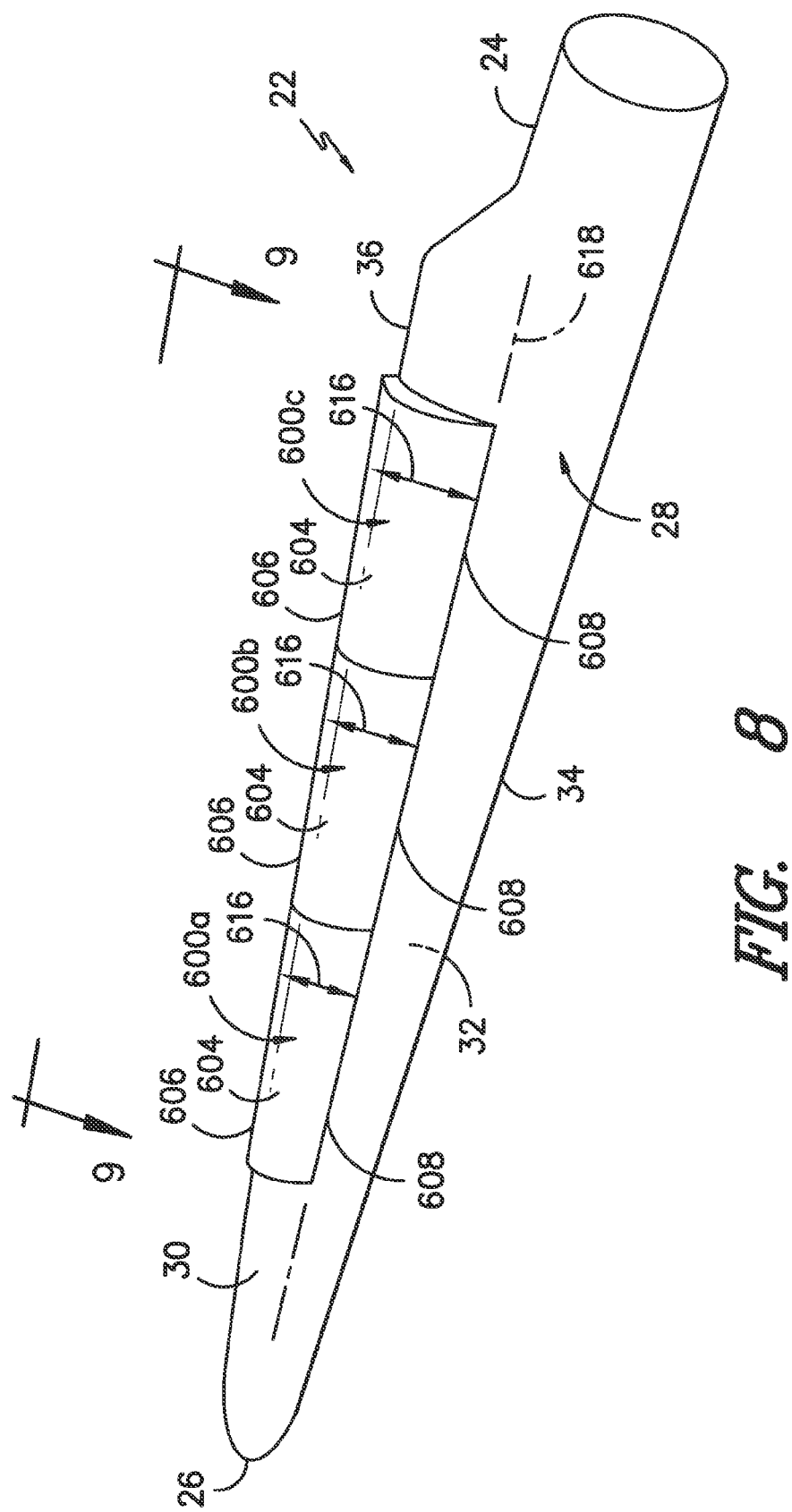

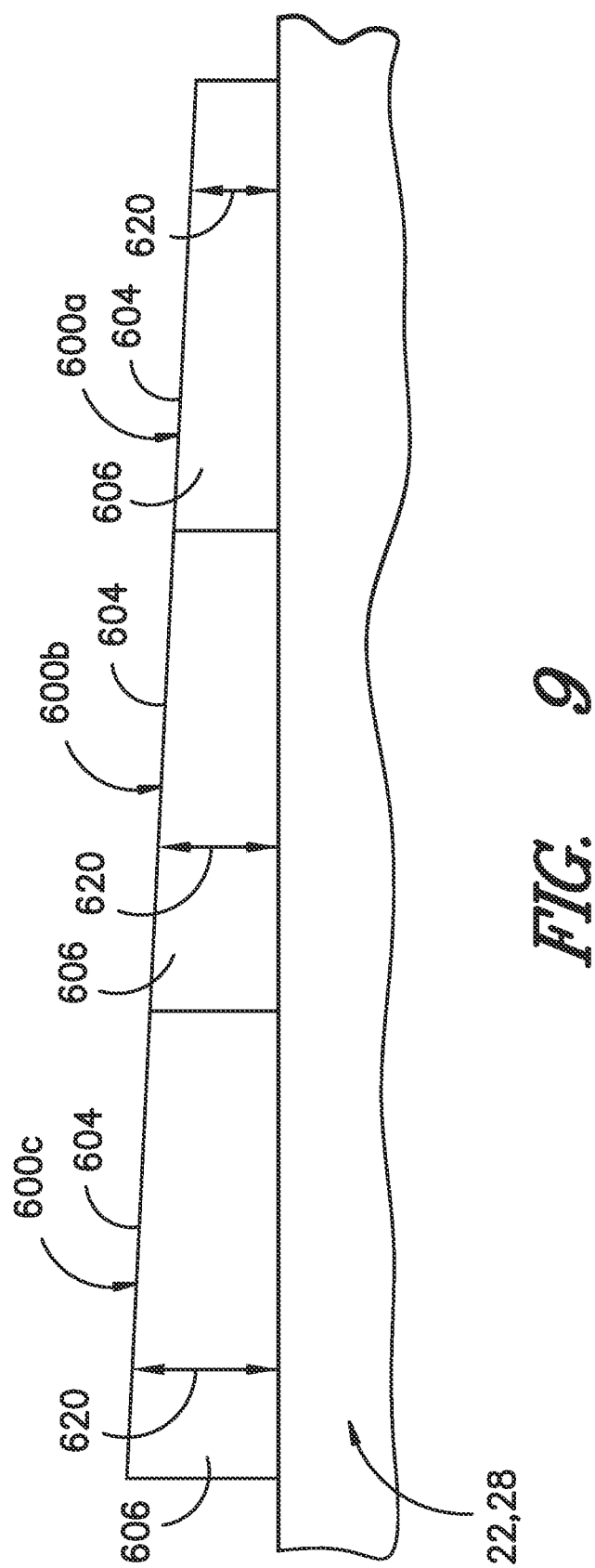

AIRFOIL MODIFIERS FOR WIND TURBINE ROTOR BLADES

FIELD OF THE INVENTION

The present subject matter relates generally to wind turbines and, more particularly, to airfoil modifiers that may be installed onto a wind turbine rotor blade to modify the aerodynamic profile of such blade.

BACKGROUND OF THE INVENTION

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

In order to achieve higher performing rotor blades with increased annual energy production, "flatback" airfoils have been tested and used for the inboard sections of blades. Compared to thick conventional, sharp trailing-edge airfoils, a flatback airfoil with the same thickness exhibits increased lift and reduced sensitivity to fouling. Conventionally, flatback airfoils are formed integrally with the rotor blade during the molding process and, thus, have only been available for newly manufactured rotor blades. However, U.S. Patent Application Publication Number 2010/0278657 (Kildegaard), entitled "Wind Turbine Blade and Blade Element Combination and Method of Changing the Aerodynamic Profile of a Wind Turbine Blade," discloses a separate blade element that may be installed onto a rotor blade to create a truncated or flatback airfoil. Specifically, the blade element is installed onto a rotor blade such that a planar end surface of the blade element is directly aligned with the trailing edge, thereby creating a blunt trailing edge defining a perpendicular angle relative to the chord of the rotor blade. While such a blade element provides a means for creating a conventional flatback airfoil shape, it is desirable to provide rotor blades with modified flatback airfoil shapes to further enhance the overall performance of the blades.

Accordingly, an airfoil modifier that may be installed onto a rotor blade to create a modified flatback airfoil design would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor blade for a wind turbine. The rotor blade may include a body extending between a blade root and a blade tip. The body may define a pressure side and a suction side extending between a leading edge and a trailing edge. In addition, the body may define a chord line extending between the leading and trailing edges. The rotor blade may also include an airfoil modifier coupled to at least one of the pressure side or the suction side of the body. The airfoil modifier may define an end surface disposed adjacent to the trailing edge. At least a portion of the end surface may extend at a non-perpendicular angle relative to the chord.

In another aspect, the present subject matter is directed to a rotor blade for a wind turbine. The rotor blade may include a body extending between a blade root and a blade tip. The body may define a pressure side and a suction side extending between a leading edge and a trailing edge. In addition, the body may define a chord line extending between the leading and trailing edges. The rotor blade may also include an airfoil modifier coupled to at least one of the pressure side or the suction side of the body. The airfoil modifier may define an end surface spaced inward from the trailing edge.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 8 illustrates a perspective view of a rotor blade including a plurality of airfoil modifiers installed thereon in accordance with aspects of the present subject matter; and, FIG. 9 illustrates a trailing edge view of the rotor blade shown in FIG. 8 looking from the perspective of line 9-9.

DETAILED DESCRIPTION OF THE INVENTION

Figure 1:
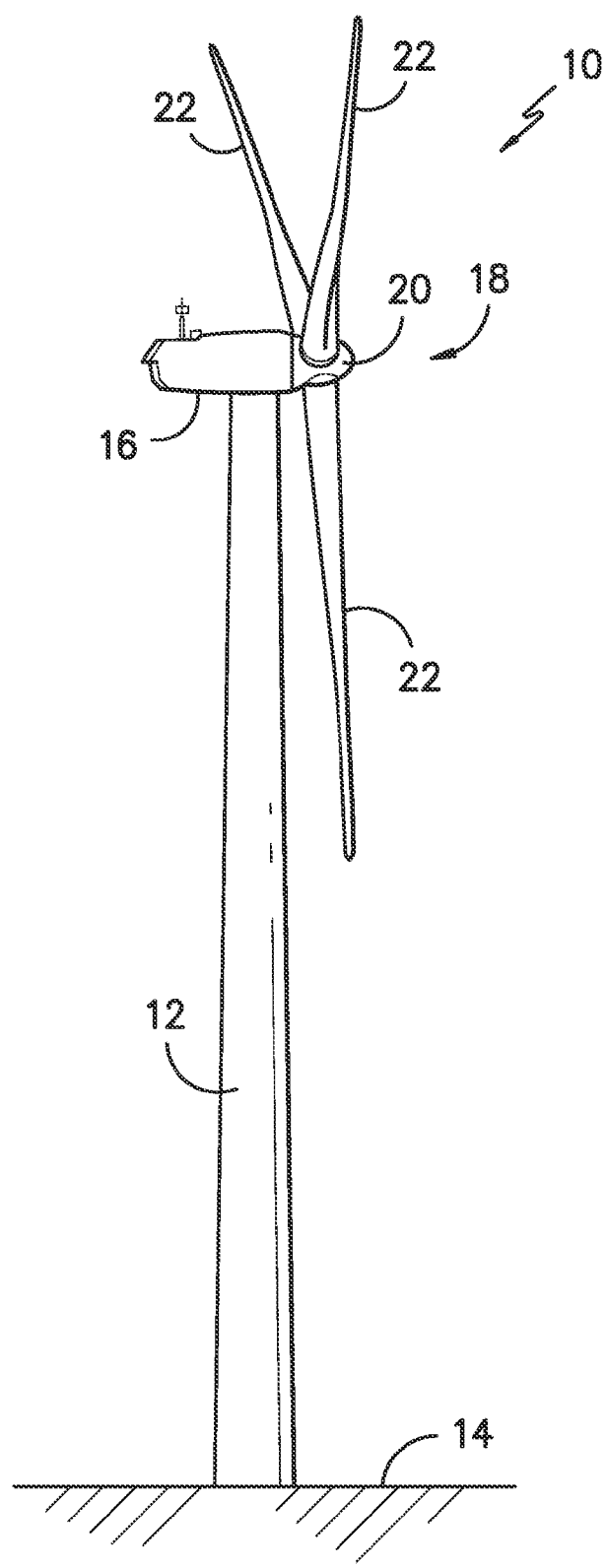
FIG. 1 illustrates a perspective view of one embodiment of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a rotor blade including one or more airfoil modifiers configured to be installed thereon in order to modify the blade's aerodynamic profile. In several embodiments, the airfoil modifiers may be configured to be installed along a portion of the rotor blade extending adjacent to its trailing edge so that the airfoil modifiers may be used to form a modified flatback airfoil shape. For example, as an alternative to including a blunt, perpendicularly extending end surface at the trailing edge, the end surfaces of the airfoil modifiers may be angled inwardly or outwardly to modify the aerodynamic shape of the rotor blade at the trailing edge. In another embodiment, the end surfaces of the airfoil modifiers may be configured to define non-planar profiles (e.g., concave or convex profiles) to alter the shape of the rotor blade at the trailing edge. In further embodiments, the end surfaces of the airfoil modifiers may be spaced inwardly from the trailing edge such that the trailing edge extends outwardly from the airfoil modifiers by a given distance.

It should be appreciated that the disclosed airfoil modifiers may be configured to be installed onto rotor blades without changing the existing structure of the blades. As such, in addition to installing the airfoil modifiers onto new rotor blades, the airfoil modifiers may also be installed onto existing rotor blades in the field to enhance the overall performance of such blades. For example, the airfoil modifiers may be offered as add-on or upgrade components without the need to replace existing rotor blades.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in alternative embodiments, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
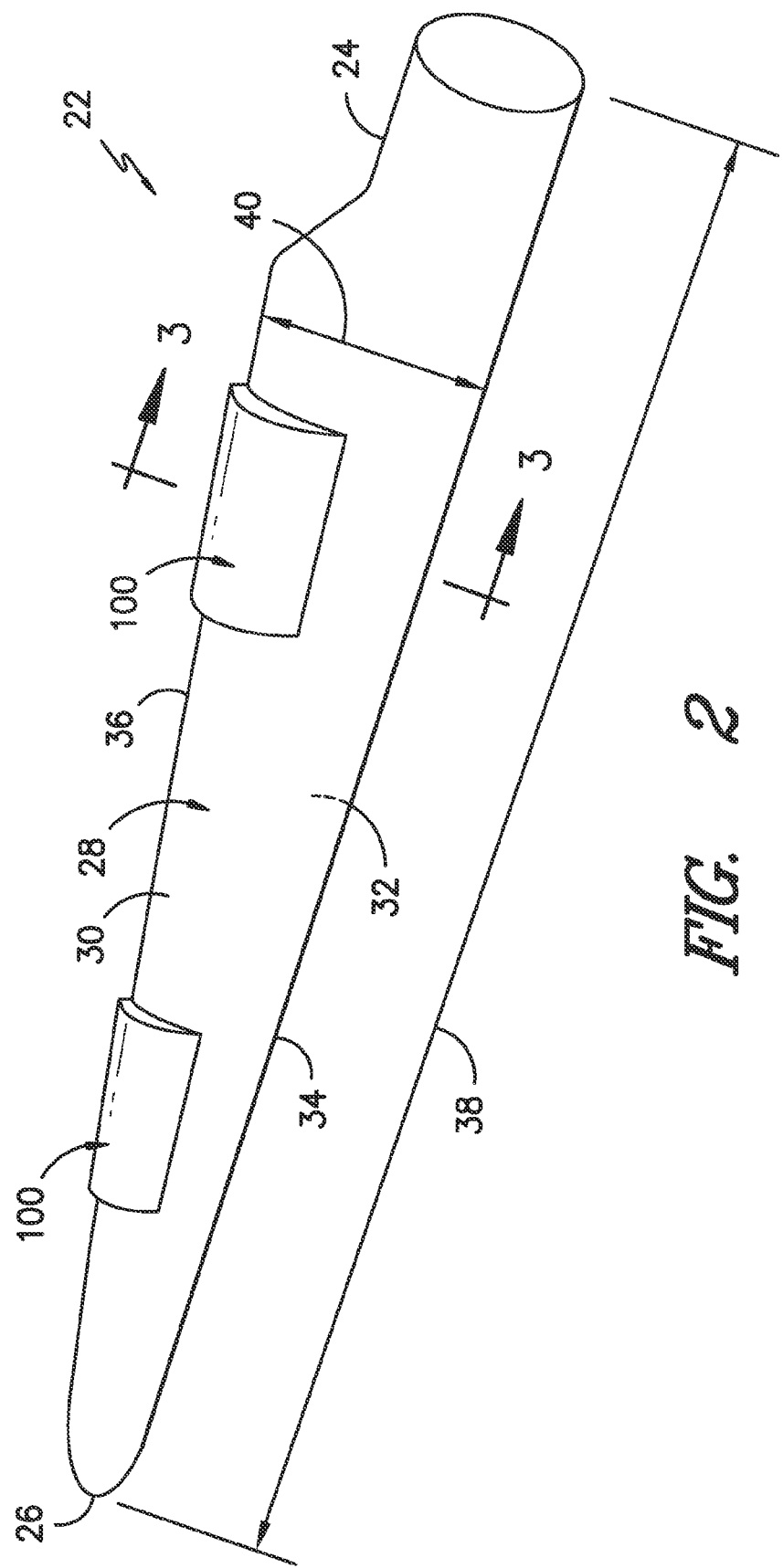
FIG. 2 illustrates a perspective view of one embodiment of a rotor blade including airfoil modifiers installed thereon in accordance with aspects of the present subject matter.
Figure 3:
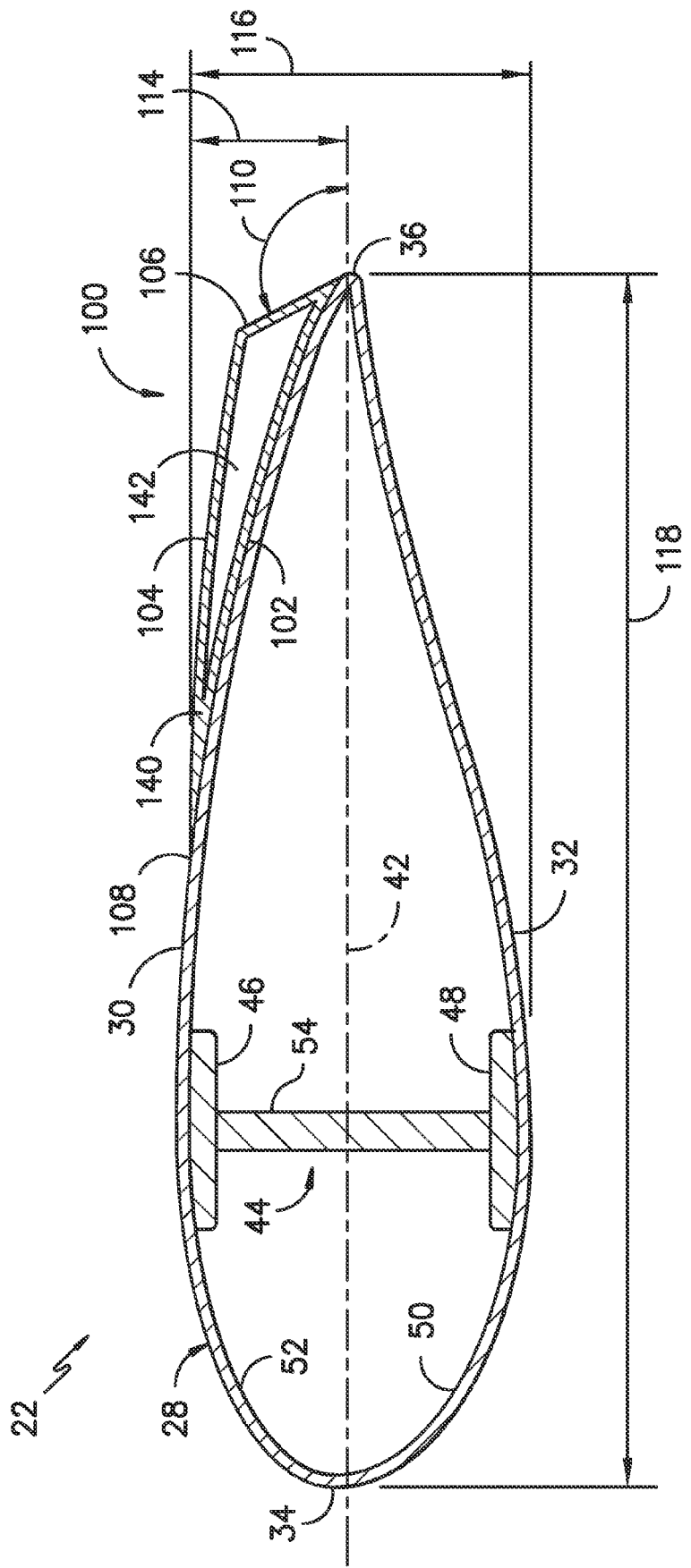
FIG. 3 illustrates a cross-sectional view of the rotor blade shown in FIG. 2 taken about line 3-3.

Referring now to FIGS. 2 and 3, one embodiment of a rotor blade 22 having one or more airfoil modifiers 100 installed thereon is illustrated in accordance with aspects of the present subject matter. In particular, FIG. 2 illustrates a perspective view of the rotor blade 22 and FIG. 3 illustrates a cross-sectional view of the rotor blade 22 taken along line 3-3.

As shown, the rotor blade 22 generally includes a blade root 24 configured to be mounted or otherwise secured to the hub 20 (FIG. 1) of a wind turbine 10 and a blade tip 26 disposed opposite the blade root 24. A body 28 of the rotor blade 22 generally extends between the blade root 24 and the blade tip 26. The body 28 may generally serve as the outer surface of the rotor blade 22. Additionally, the body 28 may define a pressure side 30 and a suction side 32 extending between leading and trailing edges 34, 36 of the rotor blade 22. Further, the rotor blade 100 may have a span 38 defining the total length between the blade root 24 and the blade tip 26 and a chord 40 defining the total length between the leading edge 34 and the trailing edge 36 (e.g., measured along dashed chord line 42 (FIG. 3)). As is generally understood, the chord 40 may generally vary in length with respect to the span 38 as the rotor blade 22 extends from the blade root 24 to the blade tip 26.

The body 28 of the rotor blade 22 may generally be configured to define an aerodynamic profile. Thus, in several embodiments, the body 28 may define an airfoil shaped cross-section. For example, the body 28 may be configured as a symmetrical airfoil or a cambered airfoil. Further, in one embodiment, the body 28 may also be aeroelastically tailored.

Moreover, as shown in FIG. 3, the rotor blade 22 may include at least one substantially rigid spar member 44 configured to provide increased stiffness and rigidity to the rotor blade 22. For example, in several embodiments, the spar member 44 may include a pair of longitudinally extending spar caps 46, 48 configured to be engaged against opposing inner surfaces 50, 52 of the pressure and suction sides 30, 32 of the blade 22. The spar member 44 may also include one or more shear webs 54 configured to extend between the opposed spar caps 46, 48.

Referring still to FIGS. 2 and 3, the rotor blade 22 may also include one or more airfoil modifiers 100 installed along the outer surface of the rotor blade 22. In general, each airfoil modifier 100 may be a non-structural component configured to modify at least a portion of the blade's aerodynamic profile. In other words, the airfoil modifiers 100 need not be configured to carry significant loads but, rather, may be designed primarily to enhance the overall performance of a rotor blade 22. For example, using one or more airfoil modifiers 100, the aerodynamic profile of a rotor blade 22 may be specifically tailored based on the blade's structural/aerodynamic design to provide increased lift, reduced noise and/or to enhance various other operating parameters of the blade 22.

In several embodiments, the airfoil modifiers 100 may be configured to be installed on the rotor blade 22 at locations near the trailing edge 36 in order to modify the aerodynamic profile of the portion of the blade body 28 extending from the trailing edge 36. For example, as shown in the illustrated embodiment, the rotor blade 22 includes two airfoil modifiers 100 coupled to the pressure side 30 of the blade body 28 such that each airfoil modifier 100 extends to a location adjacent to the trailing edge 36. In such an embodiment, it should be appreciated that the airfoil modifiers 100 may generally be positioned at any suitable location along the span 38 of the rotor blade 22. For instance, as shown in FIG. 2, the airfoil modifiers 100 are spaced apart from one another along the span 38. However, in other embodiments, the airfoil modifiers 100 may be positioned directly adjacent to one another (e.g., as shown in FIG. 8). It should also be appreciated that, in alternative embodiments, the rotor blade 22 may include any other suitable number of airfoil modifiers 100 installed thereon, such as a single airfoil modifier 100 or three or more airfoil modifiers 100.

As particularly shown in FIG. 3, each airfoil modifier 100 may generally define a three-sided shape (e.g., a generally triangular shape) including a body-side surface 102, an airflow surface 104 and an end surface 106 extending between the body-side and airflow surfaces 102, 104. The body-side surface 102 may generally be configured to extend adjacent to the outer surface of the blade body 28 when the airfoil modifier 100 is coupled to the rotor blade 22. Thus, as shown in FIG. 3, the body-side surface 102 may generally be configured to conform to or otherwise match the contour of the surface extending along a portion of the pressure side 30 of the rotor blade 22. However, in embodiments in which the airfoil modifier 100 is coupled to the suction side 32 of the blade 22, the body-side surface 102 may be configured to conform to or otherwise match the contour of the surface extending along a portion of the suction side 32.

The airflow surface 104 of each airfoil modifier 100 may generally be configured to intersect the body-side surface 102 at a leading edge 108 of the airfoil modifier 100. In addition, the airflow surface 104 may generally correspond to the primary surface along which air is directed or otherwise flows during operation of the wind turbine 10. For example, in the illustrated embodiment, air flowing along the pressure side 30 of the rotor blade 22 may transition from the outer surface of the blade body 28 to the airflow surface 104 at the leading edge 108 of the airfoil modifier 100. As such, it should be appreciated that the leading edge 108 may be configured to generally define a smooth, continuous transition surface between the body 28 and the airfoil modifier 100 to ensure that the air flowing along the rotor blade 22 is not interrupted at the interface between such components.

In several embodiments, the end surface 106 of each airfoil modifier 100 may be configured to extend between the body-side and airflow surfaces 102, 104 at a location generally adjacent to the trailing edge 36 of the rotor blade 22. Additionally, the end surface 106 may be configured to define any suitable profile (e.g., planar or non-planar) that allows at least a portion of the end surface 106 to be oriented at a non-perpendicular angle relative to the chord line 42 of the rotor blade 22. For example, as shown in FIG. 3, the end surface 106 defines a planar profile, with the edge of the end surface 106 that intersects the body-side surface 102 being immediately adjacent to the trailing edge 36 and the remainder of the end surface 106 being angled inwardly (i.e., towards the leading edge 34) such that a non-perpendicular, obtuse angle 110 is defined between the end surface 106 and the chord line 42. In such an embodiment, the angle 110 defined between the end surface 106 and the chord line 42 may generally be any suitable angle that is greater than 90 degrees, such an angle ranging from greater than 90 degrees to about 165 degrees or an angle ranging from greater than 90 degrees to about 135 degrees and any other subranges therebetween.

By configuring the end surface 106 to be angled inwardly as shown in FIG. 3, the aerodynamic profile of the rotor blade 22 may be modified at a location inward of the trailing edge 36 (i.e., at a location closer the leading edge 34). As such, the amount of drag on the rotor blade 22 may be reduced. Specifically, it is believed that airfoil modifiers 100 having inwardly extending end surfaces 106 may provide for significantly reduced drag as opposed to airfoil modifiers having blunt end surfaces that extend from the trailing edge 36 at a perpendicular angle relative to the chord line 42.

Figure 4:
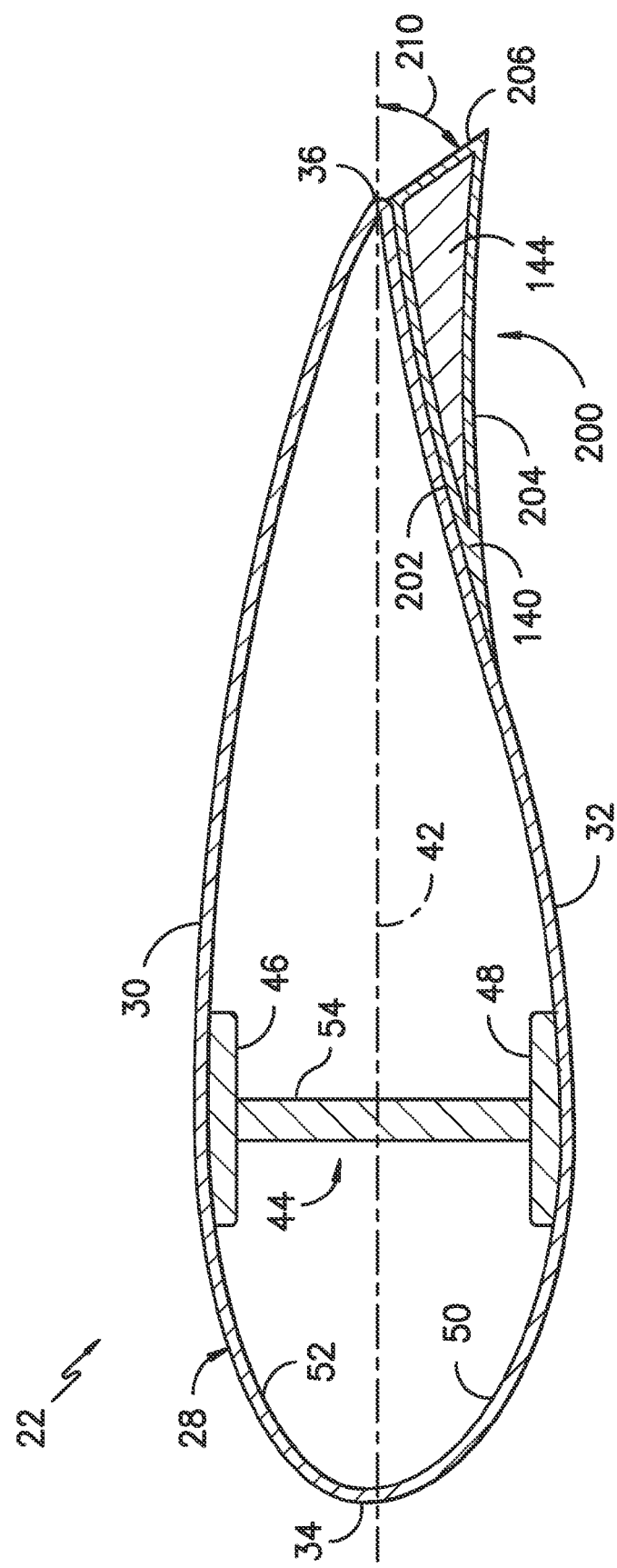
FIG. 4 illustrates a cross-sectional view of a rotor blade including another embodiment of an airfoil modifier installed thereon in accordance with aspects of the present subject matter.

Referring now to FIG. 4, a cross-sectional view of a rotor blade 22 having another embodiment of an airfoil modifier 200 installed thereon is illustrated in accordance with aspects of the present subject matter. As shown in FIG. 4, the airfoil modifier 200 is coupled to the rotor blade 22 along the suction side 32 of the blade body 28. However, in other embodiments, the airfoil modifier 200 may be coupled along the pressure side 30 of the body 28. In general, the airfoil modifier 200 may be configured similarly to the airfoil modifiers 100 described above. For example, the airfoil modifier 200 may define a body-side surface 202 configured to extend adjacent to the outer surface of the blade body 28, an airflow surface 204 over which air is directed during operation of the wind turbine 10 and an end surface 206 extending between the body-side and airflow surfaces 202, 204 at a location generally adjacent to the trailing edge. As shown in FIG. 4, the end surface 206 of the airfoil modifier 200 may be configured to define a planar profile, with the edge of the end surface 206 that intersects the body-side surface 202 being immediately adjacent to the trailing edge 28. However, in an alternative embodiment, the end surface 206 may be configured to define a non-planar profile However, unlike the embodiment described above with reference to FIG. 3, the end surface 206 is angled outwardly from the trailing edge 36 (i.e., away from the leading edge 34) at a non-perpendicular angle 210. Specifically, as shown in FIG. 4, an acute angle 210 may be defined between the end surface 206 and the chord line 42 such that the end surface 206 extends in the chordwise direction beyond the trailing edge 36. In such an embodiment, the angle 210 defined between the end surface 206 and the chord line 42 may generally be any suitable angle that is less than 90 degrees, such an angle ranging from about 10 degrees to less than 90 degrees or an angle ranging from about 45 degrees to less than 90 degrees and any other subranges therebetween.

By configuring the end surface 206 to be angled outwardly as shown in FIG. 4, the effective chord length of the rotor blade 22 may be increased by the length of the portion of the airfoil modifier 200 that extends beyond the trailing edge 36. As is generally understood, such an increased effective chord length may generally allow for the overall performance of the rotor blade 22 to be enhanced.

Figure 5:
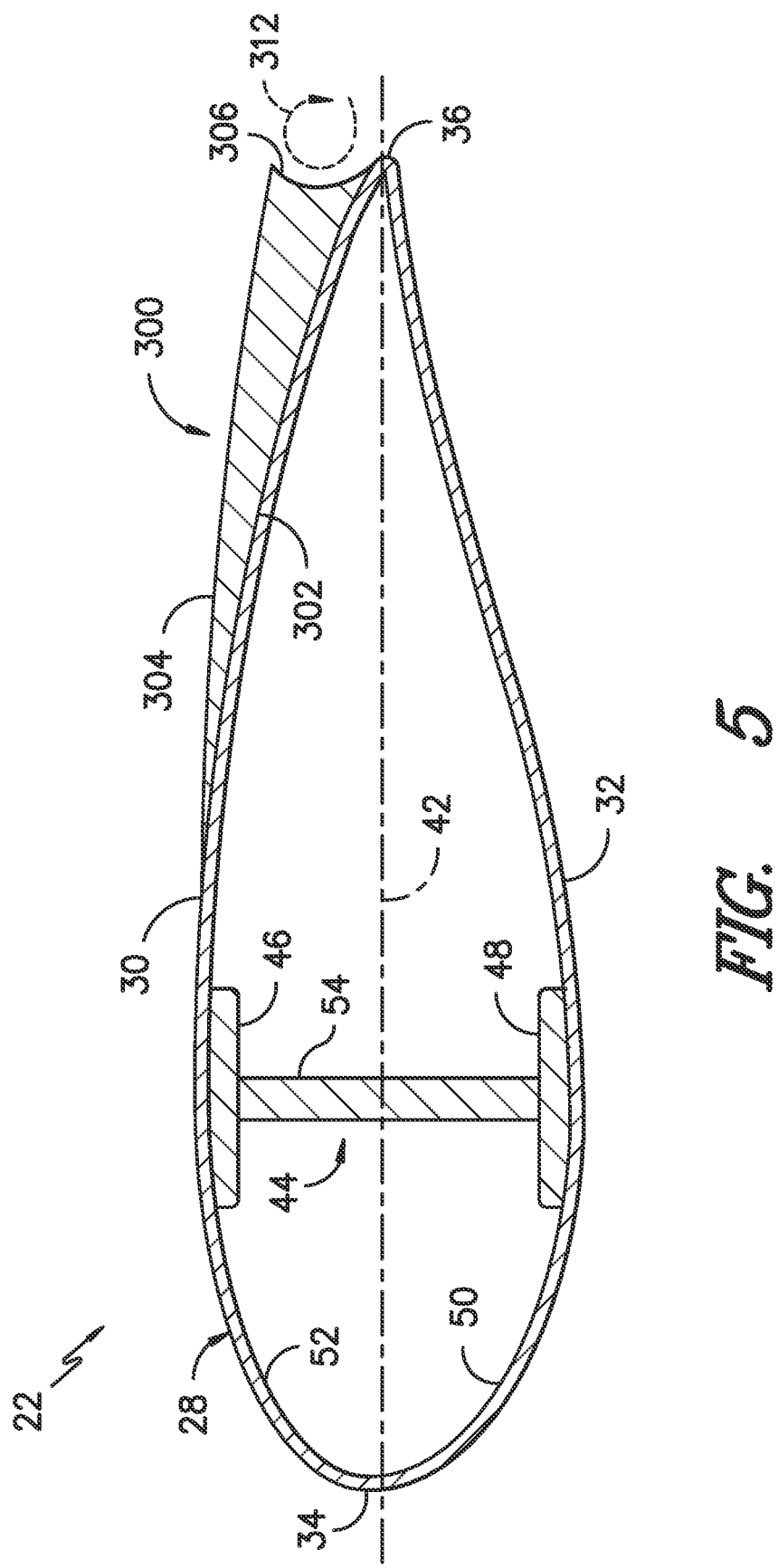
FIG. 5 illustrates a cross-sectional view of a rotor blade including a further embodiment of an airfoil modifier installed thereon in accordance with aspects of the present subject matter.

Referring now to FIG. 5, a cross-sectional view of a rotor blade 22 having another embodiment of an airfoil modifier 300 installed thereon is illustrated in accordance with aspects of the present subject matter. As shown in FIG. 5, the airfoil modifier 300 is coupled to the rotor blade 22 along the pressure side 30 of the blade body 28. However, in other embodiments, the airfoil modifier 300 may be coupled along the suction side 32 of the body 28. In general, the airfoil modifier 300 may be configured similarly to the airfoil modifiers 100, 200 described above. For example, the airfoil modifier 300 may define a body-side surface 302 configured to extend adjacent to the outer surface of the body 28, an airflow surface 304 over which air is directed during operation of the wind turbine 10 and an end surface 306 extending between the body-side and airflow surfaces 302, 304 at a location generally adjacent to the trailing edge 36.

However, unlike the embodiments described above with reference to FIGS. 3 and 4, the end surface 306 may be configured to define a non-planar profile, thereby allowing the surface 306 to be oriented at multiple different angles relative to the chord line 42. Specifically, as shown in the illustrated embodiment, the end surface 306 defines a curved, concave profile between the body-side and airflow surfaces 302, 304. In such an embodiment, both edges of the end surface 306 (i.e., the edges intersecting the body-side and airflow surfaces 302, 304) may be configured to be aligned with the trailing edge 36. Alternatively, the end surface 306 may be angled inwardly or outwardly (e.g., similar to that shown in FIGS. 3 and 4) such that the edge of the end surface 306 that intersects the airflow surface 304 is positioned inward relative to the trailing edge 36 (i.e., closer to the leading edge 34) or outward relative to the trailing edge 36 (i.e., further away from the leading edge 34).

By configuring the end surface 306 to define a curved, concave profile as shown in FIG. 5, various advantages may be provided to a rotor blade 22. For example, in addition to increased blade performance (e.g., increased lift), the concave shape may also provide for a reduction in the amount of noise and drag generated by the rotor blade 22. Specifically, it is believed that, during operation of the wind turbine 10, a circular vortex or vacuum may be generated along the end surface 306 (shown by the dashed line 312 in FIG. 5) that serves to maintain separation of the air flowing along the pressure and suction sides 30, 32 as it reaches the trailing edge 36, thereby reducing the magnitude of the noise and drag created by the blade 22.

It should be appreciated that, in several embodiments, the configuration of the end surface 306 may be specifically tailored to optimize the noise-reducing and/or drag-reducing properties of the airfoil modifier 300. For example, the height and/or the curvature of the end surface 306 may be tailored to enhance the noise-reducing and/or drag-reducing properties based on the particular structural design of the rotor blade 22 and/or based on the particular operating parameters of the wind turbine 10.

Figure 6:
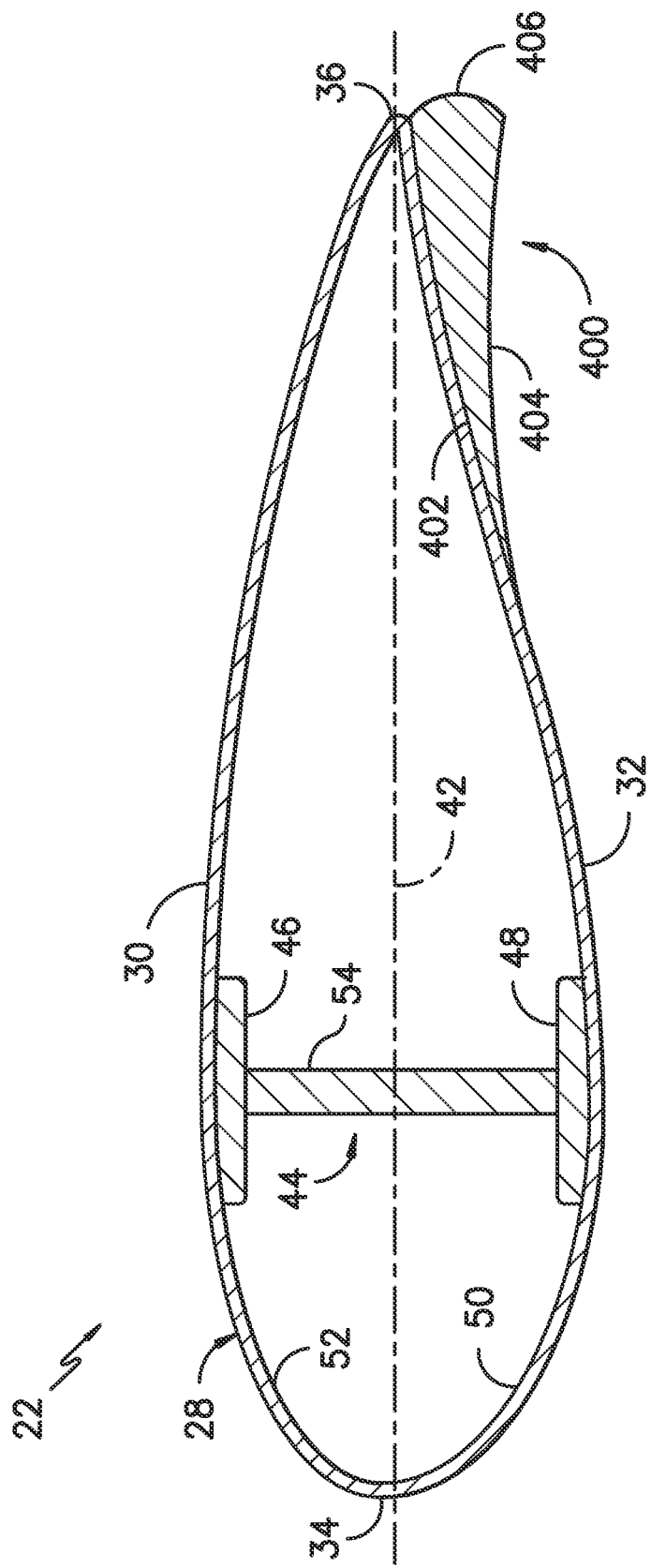
FIG. 6 illustrates a cross-sectional view of a rotor blade including yet another embodiment of an airfoil modifier installed thereon in accordance with aspects of the present subject matter.

Referring now to FIG. 6, a cross-sectional view of a rotor blade 22 having yet another embodiment of an airfoil modifier 400 installed thereon is illustrated in accordance with aspects of the present subject matter. As shown in FIG. 6, the airfoil modifier 400 is coupled to the rotor blade 22 along the suction side 32 of the body 28. However, in other embodiments, the airfoil modifier 400 may be coupled along the pressure side 30 of the body 28. In general, the airfoil modifier 400 may be configured similarly to the airfoil modifiers 100, 200, 300 described above. For example, the airfoil modifier 400 may define a body-side surface 402 configured to extend adjacent to the outer surface of the body 28, an airflow surface 404 over which air is directed during operation of the wind turbine 10 and an end surface 406 extending between the body-side and airflow surfaces 402, 404 at a location generally adjacent to the trailing edge 36.

Additionally, similar to the embodiment described above with reference to FIG. 5, the end surface 406 may be configured to define a non-planar profile. Specifically, as shown in the illustrated embodiment, the end surface 406 defines a curved, convex profile between the body-side and airflow surfaces 402, 404. In such an embodiment, both edges of the end surface 406 (i.e., the edges intersecting the body-side and airflow surfaces 402, 404) may be configured to be aligned with the trailing edge 36. Alternatively, the end surface 406 may be angled inwardly or outwardly (e.g., similar to that shown in FIGS. 3 and 4) such that the edge of the end surface 406 that intersects the airflow surface 404 is positioned inward relative to the trailing edge 36 (i.e., closer to the leading edge 34) or outward relative to the trailing edge 36 (i.e., further away from the leading edge 34).

By configuring the end surface 406 to define a convex profile as shown in FIG. 6, the effective chord length of the rotor blade 22 may be increased by the length of the portion of the airfoil modifier 400 that extends beyond the trailing edge 36. As is generally understood, such an increased effective chord length may generally allow for the overall performance of the rotor blade 22 to be enhanced.

It should be appreciated that, as an alternative to configuring the end surfaces 306, 406 in the manner shown in FIGS. 5 and 6, the end surfaces 306, 406 may be configured to define any other suitable non-planar profile. For example, in other embodiments, the end surfaces 306, 406 may be configured to define a wavy profile (e.g., an "S-shaped" profile), a triangular-shaped profile or any other suitable non-planar shape/profile.

Figure 7:
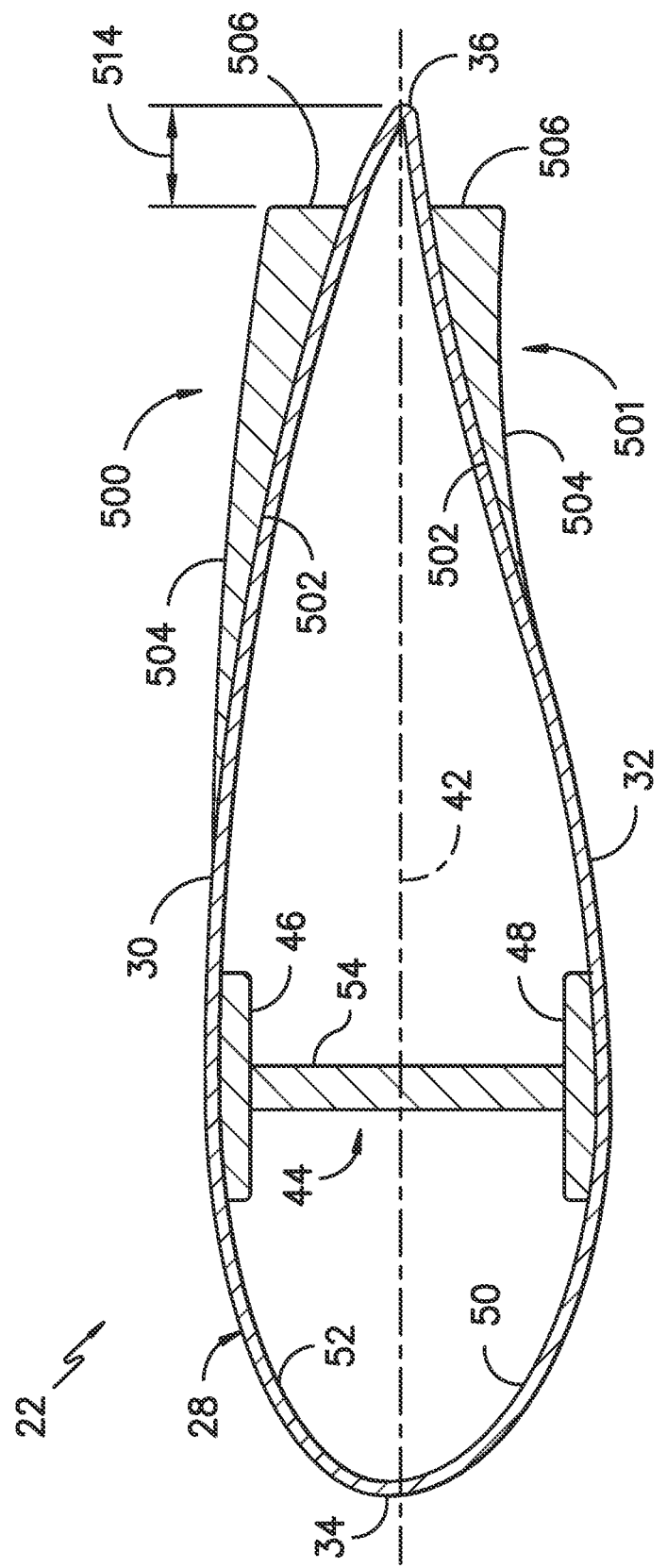
FIG. 7 illustrates a cross-sectional view of a rotor blade including an even further embodiment of an airfoil modifier installed thereon in accordance with aspects of the present subject matter.

Referring now to FIG. 7, a cross-sectional view of a rotor blade having multiple airfoil modifiers 500, 501 installed thereon is illustrated in accordance with aspects of the present subject matter. Specifically, as shown in FIG. 7, the rotor blades includes a first airfoil modifier 500 installed along the pressure side 30 of the rotor blade 22 and a second airfoil modifier 501 installed along the suction side 32 of the rotor blade 22. In general, the first and second airfoil modifiers 500, 501 may be configured similarly to the airfoil modifiers 100, 200, 300, 400 described above. For example, each airfoil modifier 500, 501 may define a body-side surface 502 configured to extend adjacent to the outer surface of the blade body 28, an airflow surface 504 over which air is directed during operation of the wind turbine 10 and an end surface 506 extending between the body-side and airflow surfaces 502, 504.

However, unlike the embodiments described above, the entire end surface 506 of each airfoil modifier 500, 501 is disposed inward relative to the trailing edge 36 (i.e., closer to the leading edge 34). For example, as shown in FIG. 7, the end surfaces 506 may be spaced inwardly from the trailing edge 36 such that the trailing edge 36 extends beyond the end surfaces 506 by a distance 514. In such an embodiment, the distance 514 may generally vary depending on numerous factors including but not limited to, the shape, size and/or other parameters of the rotor blade 22. However, in several embodiments, the distance 514 may generally range from about 0% to about 75% of the local chord of the rotor blade 22 (i.e., the chord distance defined at the location of the airfoil modifiers 500, 501), such as from about 0% to about 50% of the local chord or from about 0% to about 25% of the local chord and any other subranges therebetween.

In embodiments in which the entire end surface 506 of each airfoil modifier 500, 501 is spaced inwardly from the trailing edge 36, it should be appreciated that the end surfaces 506 may be configured to define any suitable profile and/or shape. For example, as shown in FIG. 7, each end surface 506 has a planar profile defining a generally perpendicular angle relative to the chord line 42. As such, each point along the end surfaces 506 may generally be spaced apart from the trailing edge 36 by the same distance 514. However, in alternative embodiments, the end surfaces 506 may be angled inwardly or outwardly (e.g., similar to that shown in FIGS. 3 and 4) and/or may define non-planar profiles (e.g., similar to that shown in FIGS. 5 and 6). In such embodiments, it should be appreciated that the distance 514 defined between the trailing edge 36 and the end surface 506 may vary at different points along the length of each end surface 506.

By configuring the airfoil modifiers 500, 501 as shown in FIG. 7, various advantages may be provided to a rotor blade 22. For example, in addition to increased blade performance (e.g., increased lift), the spacing defined between the end surfaces 506 and the trailing edge 36 may also allow for a reduction in the amount of noise and drag generated by the rotor blade 22. Specifically, it is believed that the portion of the trailing edge 36 extending beyond the end surfaces 506 may serve to maintain separation of the air flowing along the pressure and suction sides 30, 32 as it reaches the trailing edge 36, thereby reducing the magnitude of the noise and drag created by the blade 22.

It should be appreciated that, in alternative embodiments, the entire end surface 506 need not be spaced inward from the trailing edge 36. For example, in one embodiment, the edge of the end surface 506 that intersects the body-side surface 502 may be disposed inwardly from the trailing edge 36 by a given distance 514 while the remainder of the end surface 506 is angled outwardly from the body-side surface 502 such that at least a portion of the end surface 506 extends beyond the trailing edge 36.

It should also be appreciated that the rotor blade 22 need not include both the first and second airfoil modifiers 500, 501. For example, in a particular embodiment, the rotor blade 22 may simply include a single airfoil modifier at a given spanwise location that defines an edge surface 506 spaced inwardly from the trailing edge 36.

Referring now to FIGS. 8 and 9, perspective and edge views of a rotor blade 22 including a plurality of airfoil modifiers (e.g., a first airfoil modifier 600a, a second airfoil modifier 600b and a third airfoil modifier 60c) installed thereon is illustrated in accordance with aspects of the present subject matter. As indicated above, in several embodiments, the airfoil modifiers 600a, 600b, 600c may be spaced apart from one another along the span 38 of the rotor blade 22. Alternatively, as shown in FIGS. 8 and 9, two or more of the airfoil modifiers 600a, 600b, 600c may be disposed directly adjacent to one another. In such an embodiment, it may be desirable to configure the airfoil modifiers 600a, 600b, 600c such that a smooth and continuous airflow surface 604 is defined between each pair of adjacent airfoil modifiers 600a, 600b, 600c.

For example, as shown in FIG. 8, each airfoil modifier 600a, 600b, 600c may define a length 616 between its leading edge 608 and its end surface 606. In one embodiment, to provide for a smooth, continuous airflow surface 604 between adjacent airfoil modifiers 600a, 600b, 600c, the length 616 of each airfoil modifier may be tapered in the spanwise direction (e.g., by reducing the length 616 as each modifier 600a, 600b, 600c extends in the direction of the blade tip 26) such that the leading edges 616 of the airfoil modifiers 600a, 600b, 600c are generally aligned along a common reference line 618. Alternatively, each airfoil modifier 600a, 600b, 600c may be configured to define the exact same length 616 such that the leading edges 608 of the airfoil modifiers 600a, 600b, 600c are generally aligned along a common reference line 618.

In addition, as shown in FIG. 9, in one embodiment, a height 620 of each airfoil modifier 600a, 600b, 600c (i.e. the distance defined between the edges of the end surface 606 of each airfoil modifier) may be similarly tapered in the spanwise direction such that a smooth and continuous airflow surface 604 is defined between adjacent airfoil modifiers 600a, 600b, 600c. In another embodiment, the airfoil modifiers 600a, 600b, 600c may simply be configured to each define the same height 620. Alternatively, in embodiments in which the airfoil modifiers 600a, 600b, 600c define differing heights, a patch or other suitable covering (not shown) may be positioned at the interface between adjacent airfoil modifiers 600a, 600b, 600c to achieve a blended and smooth airflow surface 604.

It should be appreciated that the airfoil modifiers 100, 200, 300, 400, 500, 600 described herein may generally be formed using any suitable material(s) known in the art. However, as indicated above, in several embodiments, the airfoil modifiers 100, 200, 300, 400, 500, 600 may be configured as non-structural components. Thus, it may be desirable to form the airfoil modifiers 100, 200, 300, 400, 500, 600 from one or more lightweight and/or flexible materials. For example, in one embodiment, the airfoil modifiers 100, 200, 300, 400, 500, 600 may be formed from a lightweight laminate material and/or a lightweight polymer material. Additionally, as shown in FIG. 3, in one embodiment, the airfoil modifiers 100, 200, 300, 400, 500, 600 may be hollow and, thus, may include an outer wall 140 (e.g., formed from a laminate or polymer material) defining an inner cavity or void 142. In another embodiment, shown in FIG. 4, the cavity defined by the outer wall 140 may be filled with a relatively lightweight material 144, such as foam, balsa wood and/or any other suitable filler material. Alternatively, as shown in FIGS. 5-7, the airfoil modifiers 100, 200, 300, 400, 500, 600 may be configured to define a solid, uniform cross-section.

Additionally, it should be appreciated that the disclosed airfoil modifiers 100, 200, 300, 400, 500, 600 may be configured to be installed onto or otherwise coupled to the rotor blade 22 using any suitable means known in the art. For example, in one embodiment, a suitable adhesive may be applied between the outer surface of the body 28 and each airfoil modifier 100, 200, 300, 400, 500, 600 to allow such airfoil modifiers to be coupled to the rotor blade 22. In other embodiments, any other suitable attachment means and/or method may be used to couple the airfoil modifiers 100, 200, 300, 400, 500, 600 to the rotor blade 22, such as by using suitable mechanical fasteners (e.g., bolts, screws, pins, brackets and/or the like).

It should also be appreciated that, although the present subject matter has been described herein with reference to the airfoil modifiers 100, 200, 300, 400, 500, 600 being positioned near the trailing edge 36 of a rotor blade 22, the disclosed airfoil modifiers 100, 200, 300, 400, 500, 600 may generally be configured to be positioned at any other suitable location along the chord 40 of the blade 22. For example, in one embodiment, the airfoil modifiers 100, 200, 300, 400, 500, 600 may be positioned at or near the leading edge 34 of the rotor blade 22 to modify the aerodynamic profile of the portion of the rotor blade body 28 extending from such edge 34.

Additionally, it should be appreciated that the disclosed airfoil modifiers 100, 200, 300, 400, 500, 600 may also be configured to define a height. For example, as shown in FIG. 3, the illustrated airfoil modifier 100 may define a height 114 between the uppermost and lowermost portions of the modifier 100. In several embodiments, the height 114 of each airfoil modifier 100, 200, 300, 400, 500, 600 may be selected so that the total airfoil thickness to chord ratio (e.g., using the local thickness 116 and local chord 118 shown in FIG. 3) is not increased by more than 5% by installing such airfoil modifier onto the rotor blade 22. However, in alternative embodiments, it should be appreciated that the airfoil modifiers 100, 200, 300, 400, 500, 600 may be configured to define any suitable height 114.

Moreover, it should be appreciated that, although the disclosed airfoil modifiers 100, 200, 300, 400, 500, 600 are shown in the illustrated embodiments as being fixed in position relative to the rotor blade 22, the modifiers may, in alternative embodiments, be configured to be movable relative to the rotor blade 22. For example, in one embodiment, a suitable actuator(s) may be utilized to move one or more of the airfoil modifiers 100, 200, 300, 400, 500, 600 in a chordwise direction and/or a spanwise direction relative to the rotor blade 22. In another embodiment, the airfoil modifiers 100, 200, 300, 400, 500, 600 may be configured to be moved outwardly relative to the outer surface of the rotor blade 22 (e.g., by using a suitable actuator(s) to move the modifier(s) away from the outer surface of the blade 22).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade for a wind turbine, the rotor blade comprising:
a body extending between a blade root and a blade tip, the body defining a pressure side and a suction side extending between a leading edge and a trailing edge, the body further defining a chord line extending between the leading and trailing edges;
an airfoil modifier coupled to at least one of the pressure side or the suction side of the body, the airfoil modifier defining a body-side surface extending directly adjacent to the body and an airflow surface across which air is configured to flow, the body-side and airflow surfaces intersecting one another at a leading edge of the airfiol modifier positioning directly adjacent to an outer surface of the body and diverging away from one another as the airfoil modifier extends in a chordwise direction of the rotor blade towards the trailing edge of the body such that a trailing edge of the body-side surface is spaced apart from a trailing edge of the airflow surface at a rear end of airfoil modifier, the airfoil modifier defining an end surface that extends directly between the trailing edges of the body-side and airflow surfaces along the rear end of the airfoil modifier,
wherein the end surface defines a non-planar profile corresponding to a continuously curved concave surface or a continuously curved convex surface extending from the trailing edge of the body-side surface to the trailing edge of the airflow surface.

2. The rotor blade of claim 1, wherein the end surface defines a continuously curved concave surface extending from the trailing edge of the body-side surface to the trailing edge of the airflow surface.

3. The rotor blade of claim 1, wherein the end surface defines a continuously curved convex surface extending from the trailing edge of the body-side surface to the trailing edge of the airflow surface.

4. The rotor blade of claim 1, wherein the trailing edge of the body-side surface is disposed directly adjacent to the trailing edge of the body.

5. The rotor blade of claim 1, wherein the trailing edge of the body-side surface is spaced inward from the trailing edge of the body.

6. The rotor blade of claim 5, wherein the trailing edge of the body-side surface is spaced inward from the trailing edge of the body by a distance ranging from greater than 0% of the chord to 75% of the chord.

7. The rotor blade of claim 1, wherein the airfoil modifier is coupled to the pressure side.

8. The rotor blade of claim 7, further comprising a second airfoil modifier coupled to the suction side.

9. The rotor blade of claim 1, Wherein the airfoil modifier is coupled to the suction side.

10. The rotor blade of claim 9, further comprising a second airfoil modifier coupled to the pressure side.

* * * * *